United States Patent
Rambo

(10) Patent No.: US 11,795,837 B2
(45) Date of Patent: Oct. 24, 2023

(54) EMBEDDED ELECTRIC MACHINE

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 17/158,587

(22) Filed: Jan. 26, 2021

(65) Prior Publication Data

US 2022/0235671 A1 Jul. 28, 2022

(51) Int. Cl.
| | |
|---|---|
| F01D 25/12 | (2006.01) |
| F01D 9/06 | (2006.01) |
| F01D 15/10 | (2006.01) |
| F01D 5/18 | (2006.01) |
| F02K 3/06 | (2006.01) |

(52) U.S. Cl.
CPC ............. *F01D 25/12* (2013.01); *F01D 5/187* (2013.01); *F01D 9/065* (2013.01); *F01D 15/10* (2013.01); *F02K 3/06* (2013.01); *F05D 2220/323* (2013.01)

(58) Field of Classification Search
CPC .......... F01D 25/12; F01D 5/187; F01D 9/065; F01D 15/10; F01D 5/185; F02K 3/06; F05D 2220/323
See application file for complete search history.

(56) References Cited

U.S. PATENT DOCUMENTS

| | | |
|---|---|---|
| 3,791,682 A | 2/1974 | Mitchell |
| 3,816,751 A | 6/1974 | Jampen et al. |
| 6,729,140 B2 | 5/2004 | Care et al. |
| 7,009,103 B2 | 3/2006 | Pitschi |
| 7,448,199 B2 | 11/2008 | Johnson |
| 8,113,005 B2 | 2/2012 | Gotz et al. |
| 8,146,341 B2 | 4/2012 | Siden et al. |
| 8,522,522 B2 | 9/2013 | Poisson |
| 8,596,036 B2 | 12/2013 | Hyde et al. |
| 8,853,532 B2 | 10/2014 | Eshima et al. |
| 8,857,191 B2 | 10/2014 | Hyde et al. |
| 9,038,398 B2 | 5/2015 | Suciu et al. |
| 9,097,134 B2 | 8/2015 | Ferch et al. |

(Continued)

FOREIGN PATENT DOCUMENTS

| | | |
|---|---|---|
| EP | 1921310 A1 | 5/2008 |
| EP | 2880272 A1 | 6/2015 |

*Primary Examiner* — Jacob M Amick
(74) *Attorney, Agent, or Firm* — Dority & Manning, P.A.

(57) ABSTRACT

A gas turbine engine defines a working air flowpath and includes an electrical system having an electric machine coupled to the rotary component at least partially inward of the working air flowpath along the radial direction and an electric bus electrically coupled to the electric machine. The electric bus includes an electric line extending through the working air flowpath within or downstream of a turbine section. The engine further includes a cooling system including a cooling fluid supply line and a cooling fluid return line, wherein a portion of the electric line extending though the working air flowpath is substantially embedded within the cooling fluid supply line, and wherein a portion of the cooling fluid supply line extending though the working air flowpath is substantially embedded within the cooling fluid return line.

20 Claims, 8 Drawing Sheets

(56) References Cited

U.S. PATENT DOCUMENTS

| | | |
|---|---|---|
| 9,103,226 B2 | 8/2015 | Van Der Ham et al. |
| 9,470,150 B2 | 10/2016 | Zhang et al. |
| 9,512,780 B2 | 12/2016 | Bourassa et al. |
| 9,885,248 B2 | 2/2018 | Eramaa |
| 9,917,490 B2 | 3/2018 | Lemmers et al. |
| 10,071,811 B2 | 9/2018 | Kupiszewski et al. |
| 10,093,428 B2 | 10/2018 | Kupiszewski et al. |
| 10,184,400 B2 | 1/2019 | Cerny et al. |
| 10,240,522 B2 | 3/2019 | Jones et al. |
| 10,260,419 B2 | 4/2019 | Cerny et al. |
| 10,267,191 B2 | 4/2019 | Julien et al. |
| 10,308,366 B2 | 6/2019 | Kupiszewski et al. |
| 10,422,282 B2 | 9/2019 | Williams |
| 10,436,119 B2 | 10/2019 | Kwakye et al. |
| 10,801,410 B2 | 10/2020 | Roberge |
| 2006/0042083 A1 | 3/2006 | Baker et al. |
| 2007/0157597 A1 | 7/2007 | Sharp |
| 2014/0062097 A1 | 3/2014 | Brown et al. |
| 2016/0152341 A1 | 6/2016 | Hotzeldt |
| 2017/0036773 A1 | 2/2017 | Jones et al. |
| 2017/0138259 A1 | 5/2017 | Juretzek |
| 2017/0184024 A1 | 6/2017 | Sennoun |
| 2017/0334377 A1 | 11/2017 | Klemen et al. |
| 2018/0050806 A1* | 2/2018 | Kupiszewski .......... F01D 25/18 |
| 2018/0058243 A1 | 3/2018 | Auker et al. |
| 2019/0019601 A1 | 1/2019 | Aslam |
| 2019/0153953 A1 | 5/2019 | Niergarth et al. |
| 2019/0203620 A1 | 7/2019 | Julien et al. |
| 2019/0204010 A1 | 7/2019 | Breeze-Stringfellow et al. |
| 2019/0218998 A1 | 7/2019 | Julien et al. |
| 2019/0249599 A1 | 8/2019 | Sen et al. |
| 2019/0257247 A1 | 8/2019 | Pal et al. |
| 2019/0316486 A1 | 10/2019 | Roberge |
| 2019/0360401 A1 | 11/2019 | Rambo et al. |
| 2019/0383564 A1 | 12/2019 | Miller et al. |
| 2020/0165974 A1 | 5/2020 | Smith et al. |
| 2020/0165982 A1 | 5/2020 | Smith et al. |
| 2021/0324799 A1* | 10/2021 | Suzuki .................... F01D 15/10 |

* cited by examiner

EMBEDDED ELECTRIC MACHINE

FIELD OF THE DISCLOSURE

The present subject matter relates generally to a gas turbine engine having an embedded electric machine.

BACKGROUND OF THE DISCLOSURE

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft, it may be beneficial for the propulsion system to include an electric fan to supplement propulsive power provided by the one or more gas turbine engines included with the propulsion system. However, providing the aircraft with a sufficient amount of energy storage devices to power the electric fan may be space and weight prohibitive. Notably, certain gas turbine engines may include auxiliary generators positioned, e.g., within a cowling of the gas turbine engine. However, these auxiliary generators may not be configured to provide a sufficient amount of electrical power to adequately drive the electric fan.

Accordingly, a propulsion system for an aircraft having one or more gas turbine engines and electric generators capable of providing an electric propulsor with a desired amount of electrical power would be useful.

BRIEF DESCRIPTION OF THE DISCLOSURE

Aspects and advantages of the invention will be set forth in part in the following description, or may be obvious from the description, or may be learned through practice of the invention.

In one exemplary embodiment of the present disclosure, a gas turbine engine is provided defining a radial direction and an axial direction. The gas turbine engine includes: a compressor section and a turbine section arranged in serial flow order, the compressor section and turbine section together defining a working air flowpath; a rotary component rotatable with at least a portion of the compressor section and with at least a portion of the turbine section; an electrical system comprising an electric machine coupled to the rotary component at least partially inward of the working air flowpath along the radial direction and an electric bus electrically coupled to the electric machine, the electric bus including an electric line extending through the working air flowpath within or downstream of the turbine section; and a cooling system including a cooling fluid supply line and a cooling fluid return line, wherein a portion of the electric line extending though the working air flowpath is substantially embedded within the cooling fluid supply line, and wherein a portion of the cooling fluid supply line extending though the working air flowpath is substantially embedded within the cooling fluid return line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DISCLOSURE

Figure 1:
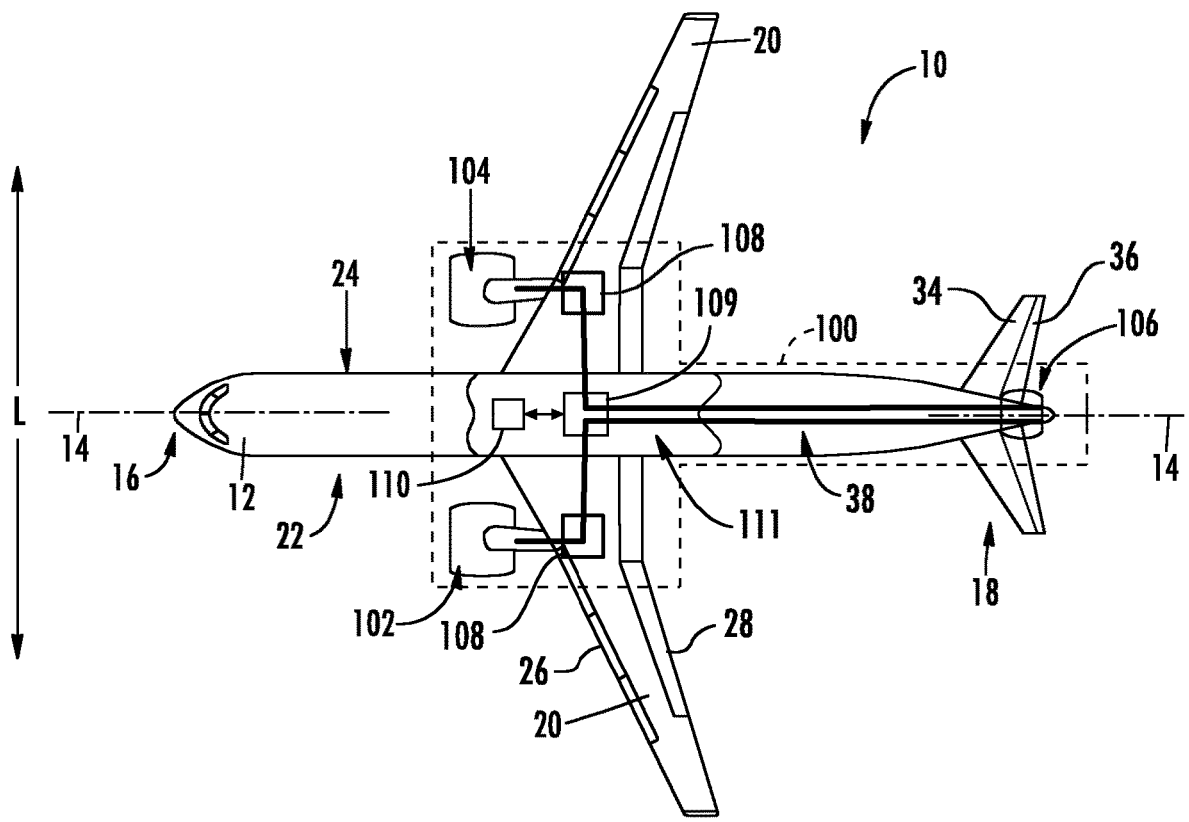
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a gas turbine engine of a propulsion system for an aircraft having an electric machine embedded therein. In at least certain embodiments, the gas turbine engine includes a compressor section and a turbine section arranged in serial flow order and together defining a working air flowpath. A rotary component, such as a shaft or spool, is rotatable with at least a portion of the compressor section and the turbine section.

The propulsion system and/or gas turbine engine additionally includes an electrical system and a cooling system. The electrical system includes an electric machine embedded within the gas turbine engine and an electric bus. For example, the electric machine may be rotatable with the rotary component and positioned coaxially with the rotary component at least partially inward of the working air flowpath along a radial direction of the gas turbine engine. For example, in at least certain embodiments, the electric machine may be an electric generator, driven by the rotary component. The electric bus includes an electric line extending through the working air flowpath within or downstream of the turbine section.

The cooling system is provided to maintain a temperature of the electric machine and electric bus within desired operating temperature ranges, despite their respective locations within a hot section of the engine. In particular, the cooling system includes a cooling fluid supply line and a cooling fluid return line. A portion of the electric line extending though the working air flowpath is substantially embedded within the cooling fluid supply line, and a portion of the cooling fluid supply line extending though the working air flowpath is substantially embedded within the cooling fluid return line. In such a manner, the electric line extending through the working air flowpath is very well shielded from the hot gasses flowing through the turbine section of the engine, and further, a flow of relatively cool cooling fluid through the cooling fluid supply line is also shielded from the hot gasses flowing through the turbine section of the engine.

The relatively cool cooling fluid through the cooling fluid supply line may be used to cool the embedded electric machine and optionally other components located within the hot section of the engine (e.g., sumps, bearings, etc.).

A gas turbine engine according to such a configuration may allow for inclusion of an embedded electric machine capable of generating high amounts of electrical power, and transferring such electrical power at high voltages through the working air flowpath with a reduced risk of substantial losses and, e.g., corona discharge losses.

Figure 2:
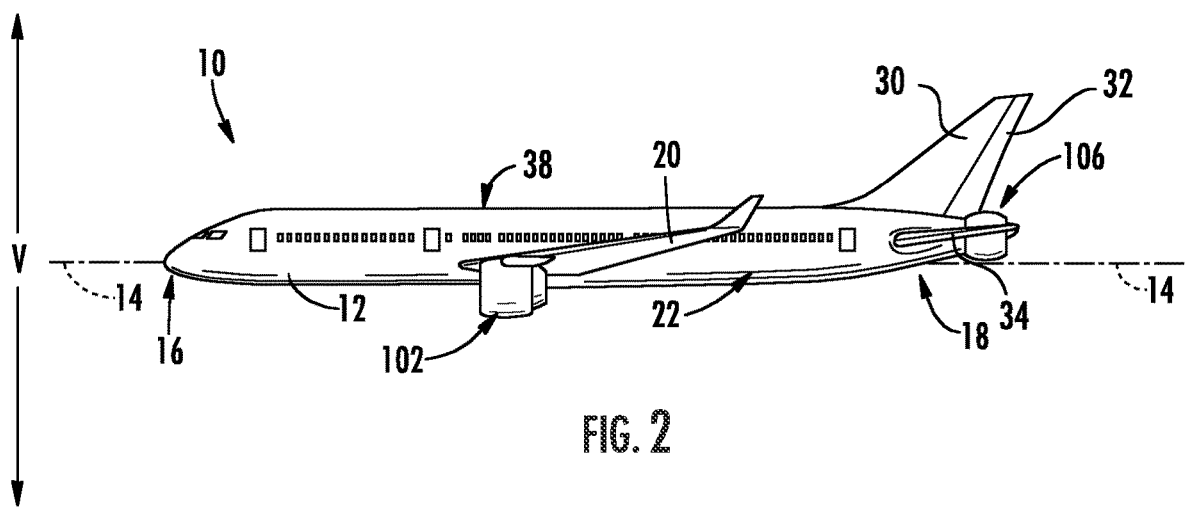
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18.

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream ingestion fan (e.g., in an under-wing-mounted configuration, in a fuselage-mounted configuration, in a tail-mounted configuration, etc.). Furthermore, in still other embodiments, the propulsion system 100 may not include, e.g., the power conditioner 109 and/or the energy storage device 110, and instead the generator(s) 108 may be directly connected to an electric propulsor.

Figure 3:
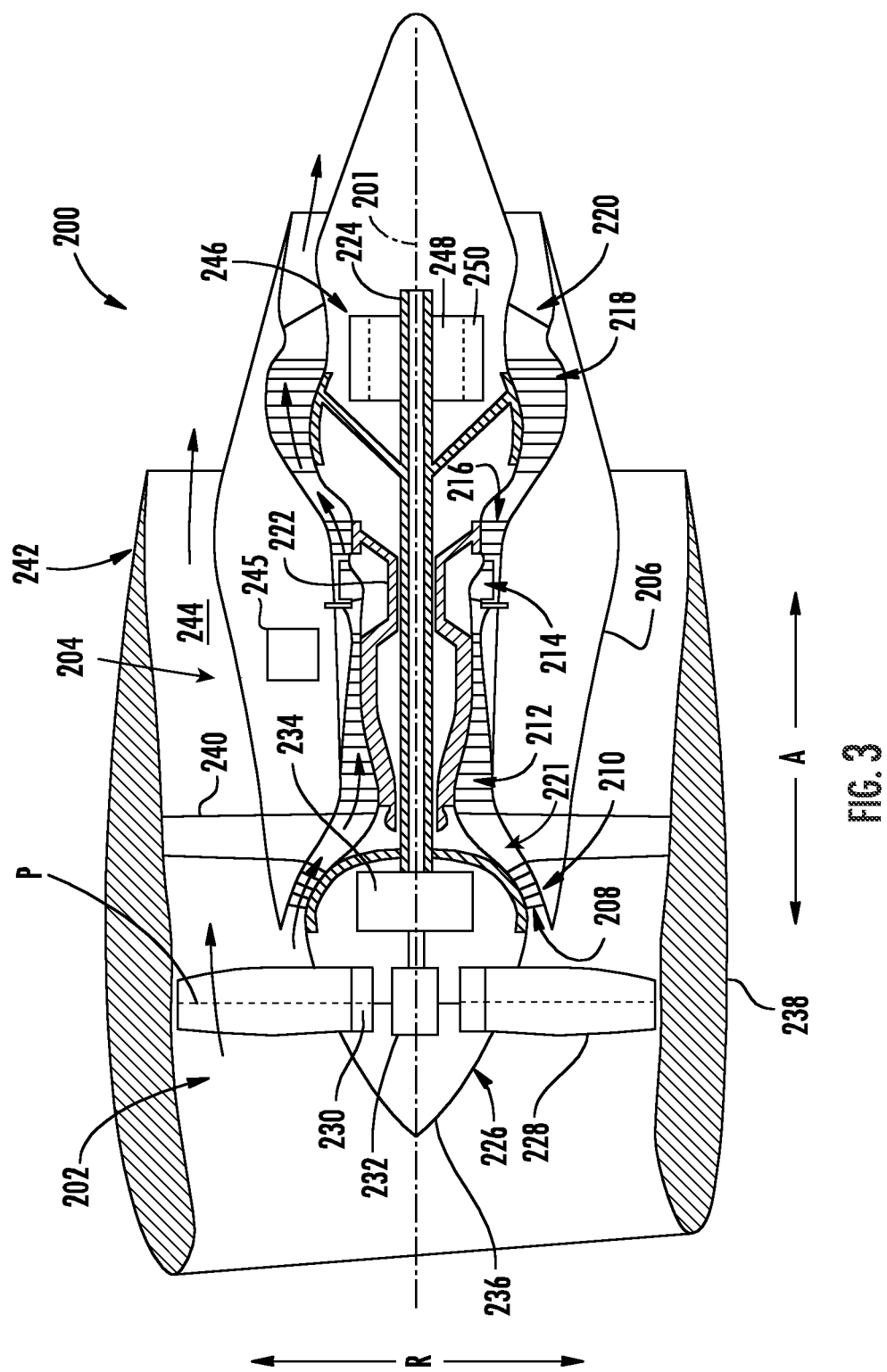
FIG. 3 is a schematic, cross-sectional view of a gas turbine engine in accordance with an exemplary aspect of the present disclosure.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A (extending parallel to a longitudinal centerline 201 provided for reference), a radial direction R, and a circumferential direction C (extending about the axial direction A; not depicted in FIG. 3). In general, the turbofan 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a working air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the turbomachine 204. The nacelle 238 is supported relative to the turbomachine 204 by a plurality of circumferentially-spaced outlet guide vanes 240. A downstream section 242 of the nacelle 238 extends over an outer portion of the turbomachine 204 so as to define a bypass airflow passage 244 therebetween.

Although not depicted, the variety of rotatory components of the turbofan engine 10 (e.g., LP shaft 224, HP shaft 222, fan 202) may be supported by one or more oil lubricated bearings. The turbofan engine 10 depicted includes a lubrication system 245 for providing one or more of the oil lubricated bearings with lubrication oil. Further, the lubrication system 245 may include one or more heat exchangers for transferring heat from the lubrication oil with, e.g., bypass air, bleed air, or fuel.

Additionally, the exemplary turbofan 200 depicted includes an electric machine 246 rotatable with the fan 226. Specifically, for the embodiment depicted, the electric machine 246 is configured as an electric generator co-axially mounted to and rotatable with the LP shaft 224 (the LP shaft 224 also rotating the fan 226 through, for the embodiment depicted, the power gearbox 234). As used herein, "co-axially" refers to the axes being aligned. It should be appreciated, however, that in other embodiments, an axis of the electric machine 246 may be offset radially from the axis of the LP shaft 224 and further may be oblique to the axis of the LP shaft 224, such that the electric machine 246 may be positioned at any suitable location at least partially inward of the working air flowpath 221.

The electric machine 246 includes a rotor 248 and a stator 250. In certain exemplary embodiments, the rotor 248 and stator 250 of the electric machine 246 are configured in substantially the same manner as the exemplary rotor and stator of the electric machine described below. Notably, when the turbofan engine 200 is integrated into the propulsion system 100 described above with reference to FIGS. 1 and 2, the electric generators 108 may be configured in substantially the same manner as the electric machine 246 of FIG. 3.

It should be also appreciated, however, that the exemplary turbofan engine 200 depicted in FIG. 3 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine.

Figure 4:
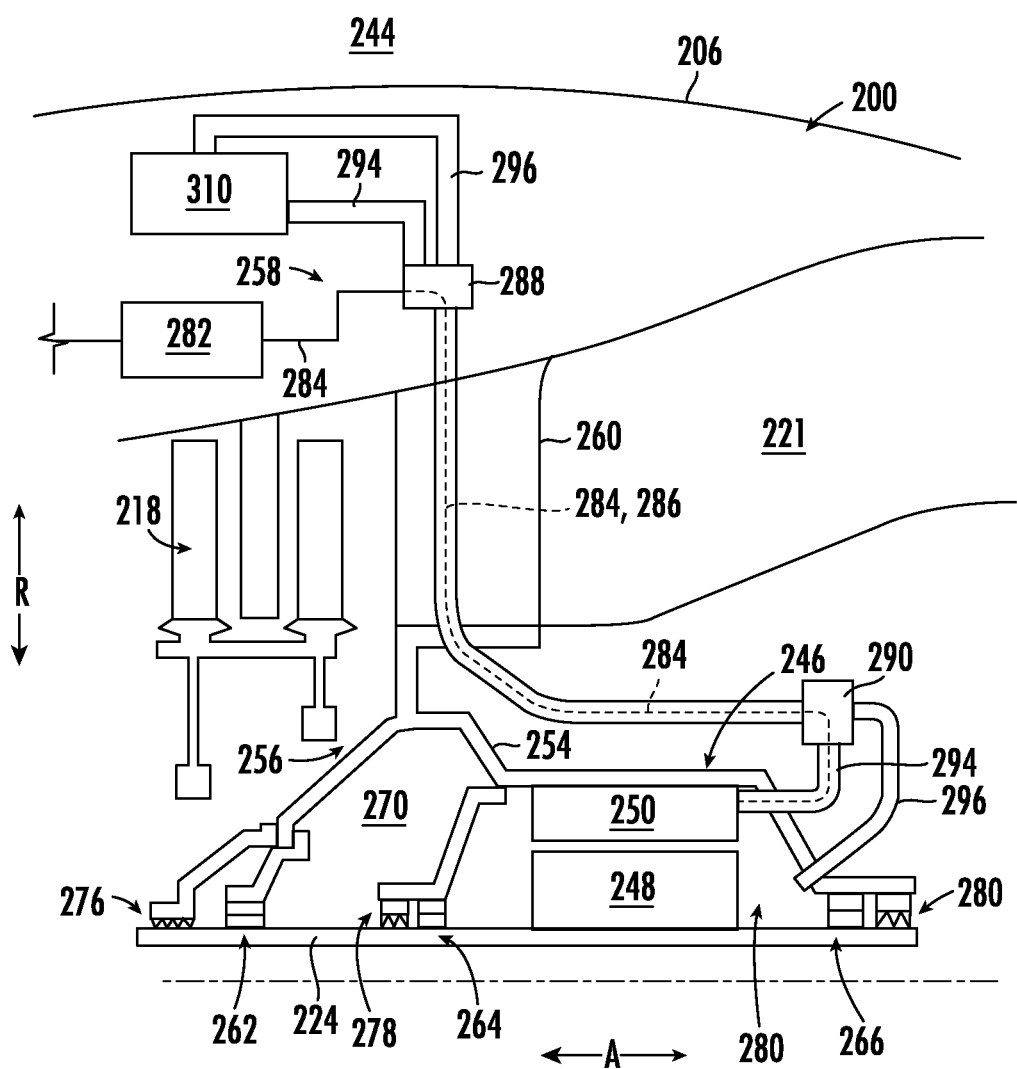
FIG. 4 is a schematic, cross-sectional view of an electric machine embedded in a gas turbine engine in accordance with an exemplary embodiment of the present disclosure.

Referring now to FIG. 4, an electric machine 246 embedded within a gas turbine engine 200 in accordance with an exemplary embodiment of the present disclosure is depicted. In certain exemplary embodiments, the electric machine 246 and gas turbine engine 200 depicted in FIG. 4 may be configured in substantially the same manner as the exemplary electric machine 246 and turbofan engine 200 described above with reference to FIG. 3. Accordingly, the same or similar numbers may refer to the same or similar parts.

More specifically, the electric machine 246 is coupled to a rotary component of the gas turbine engine 200 at a location at least partially inward of the working air flowpath 221 of the gas turbine engine 200 along the radial direction R. More specifically, still, for the embodiment depicted, the electric machine 246 is embedded within a turbine section of the gas turbine engine 200, and more specifically still, is coupled to an LP shaft 224 of the gas turbine engine 200. Additionally, the electric machine 246 is positioned at least partially within or aft of the turbine section along an axial direction A.

As is depicted, the electric machine 246 generally includes a rotor 248 and a stator 250. The rotor 248 is attached directly to the LP shaft 224, such that the rotor 248 is rotatable with the LP shaft 224. However, in other embodiments, the rotor 248 may be attached to the LP shaft 224 through one or more rotor connection members.

By contrast, the stator 250 is attached to a structural support member 256 via one or more stator connection members 254. In at least certain exemplary embodiments, the electric machine 246 may be an electric generator, such that the rotor 248 is driven by the LP shaft 224. With such an embodiment, a rotation of the rotor 248 relative to the stator 250 may generate electrical power, which may be transferred via an electric bus 258, discussed in greater detail below.

It should be appreciated, however, that in other exemplary embodiments, the electric machine 246 may instead have any other suitable configuration. For example, in other embodiments the electric machine 246 may include the rotor 248 located radially outward of the stator 250 (e.g., as an out-running electric machine 246). Additionally, in certain embodiments, the electric machine 246 may be operated as an electric motor, or may be operated as both an electric motor and an electric generator. Further, the electric machine 246 may be mounted at any suitable location inward of the working air flowpath 221, within or aft of the turbine section. For example, still, in other embodiments, the electric machine 246 may be rotatable with a high pressure shaft of the engine (not depicted in FIG. 4).

Moreover in certain exemplary embodiments, the electric machine 246 may be configured as a permanent magnet electric machine including a plurality of permanent magnets (not shown). For these embodiments, the stator 250 may include one or more coils of electrically conductive wire (not shown). It should be appreciated, however, that in other embodiments, the electric machine 246 may alternatively be configured as an electromagnetic electric machine, including a plurality of electromagnets and active circuitry, as an induction type electric machine, a switched reluctance type electric machine, as a synchronous AC electric machine, or as any other suitable electric generator or motor.

Referring still to the exemplary electric machine 246 of FIG. 4, the structural support member 256 may be configured as part of an aft frame assembly that extends from an aft frame strut 260. The aft strut 260 extends through the working air flowpath 221 of the gas turbine engine 200 and is configured to provide structural support for the gas turbine engine 200. The structural support member 256, for the embodiment shown, also extends forward to support an aft engine bearing 262—the aft engine bearing 262 rotatably supporting an aft end of the LP shaft 224.

The stator connection member 254 may be an annular/cylindrical member extending from the structural support member 256 of the gas turbine engine 200. For the embodiment depicted, the stator connection member 254 further supports rotation of the LP shaft 224 through one or more bearings. More specifically, the gas turbine engine 200 depicted further includes a forward electric machine bearing 264 is positioned forward of the electric machine 246 and between the LP shaft 224 and the stator connection member 254 along a radial direction R. Similarly, an aft electric machine bearing 266 is positioned aft of the electric machine 246 and between the LP shaft 224 and the stator connection member 254 along the radial direction R. Particularly for the embodiment depicted, the forward electric machine bearing 264 and aft electric machine bearing 266 are each depicted as a roller element bearing. However in other embodiments one or both may alternatively be configured as a ball bearing, or any other suitable bearing. For example, it should be appreciated that the forward and aft electric machine bearings 264, 266 may in other embodiments, have any other suitable configuration and the present disclosure is not intended to be limited to the specific configuration depicted, unless such limitations are added to the claims.

For the embodiment shown, the gas turbine engine 200 further defines an aft turbine sump 270. The aft turbine sump 270 is defined, for the embodiment shown, at least in part by the structural support members 256 and Stater connection members 254. The aft turbine sump 270 encloses at least in part, the aft engine bearing 262 for, e.g., containing a lubrication oil provided to the aft engine bearing 262 through a lubrication oil supply system (not depicted in FIG. 4; discussed below). For the embodiment shown, the aft turbine sump 270 is fluidly bounded by a forward sump seal 276, as well as by a forward electric machine seal 278. The forward sump seal 276 and forward electric machine seal 278 may maintain lubrication oil provided to the aft engine bearing 262 substantially within the aft turbine sump 270.

Notably, it will further be appreciated that the embodiment shown, the electric machine 246 is further positioned within an electric machine compartment 280, which depending on a fluid provided thereto (e.g. a cooling fluid, discussed below), may be referred to as an electric machine sump. The electric machine compartment 280 is defined at least in part by the stator connection member 254 and the forward electric machine seal 278. Moreover, for the embodiment shown, the gas turbine engine 200 further includes an aft electric machine seal 280, further defining the electric machine compartment 280. The forward and aft electric machine seals 278, 280 may substantially fluidly contain a fluid within the electric machine compartment 280.

It will be appreciated, however, that in other exemplary embodiments, the arrangement of the bearings 264, 266 and seals 278, 280 may be reversed, such that the seals 278 and 280 are positioned closer to the electric machine 246 than the bearings 264, 266, respectively. With such a configuration, the seals 278, 280 may substantially fluidly isolate the electric machine compartment 280 from, e.g., the aft turbine sump 270. Such a configuration may be chosen depending on, e.g., a fluid provided thereto (e.g. a cooling fluid, discussed below).

As briefly discussed above, during operation of the gas turbine engine 200 the LP shaft 224 may rotate the rotor 248 of the electric machine 246, allowing electric machine 246 to function as an electric generator producing electrical power. Additionally, the electric machine 246 is in electrical communication with—i.e. electrically connected to—the electric bus 258. The electric bus 258 may generally include a plurality of electric lines, various power electronic and converts, represented schematically as 282, etc. The electric bus 258 may electrically connect the electric machine 246 with other aircraft power sources and sinks to exchange power during operation in response to, e.g., an aircraft or engine controller.

For the embodiment show, the electric bus 258 is electrically connected to the electric machine 246 at a location radially inward of the working air flowpath 221. The electric bus 258 includes one or more electric lines, referred to for convenience as a single electric line 284, extending through the working air flowpath 221 at a location within or aft of the turbine section. More specifically, the electric line 284 includes an intermediate portion 286 extending through the working air flowpath 221. The electric bus 258 further includes a first junction box 288 located outward of the working air flowpath 221 along the radial direction R and a second junction box 290 located inward of the working air flowpath 221 along the radial direction R. The intermediate portion 286 extends from the first junction box 288 to the second junction box 290, through the working air flowpath 221.

The exemplary gas turbine engine 200 depicted further includes a cooling system 292 to assist with maintaining a temperature of the intermediate portion 286 of electric bus 258 and the electric machine 246 within a desired operating temperature range during operation of the gas turbine engine 200.

For example, as will be appreciated, each of the plurality of permanent magnets of the electric machine 246, if included, defines a Curie temperature limit which may be less than a temperature within the working air flowpath 221 extending through the turbine section of the gas turbine engine 200. The cooling system 292 of the gas turbine engine 200 may function to maintain a temperature of the electric machine 246, and more particularly each of the permanent magnets, below the Curie temperature limit for the plurality of permanent magnets. Further, the cooling system 292 may maintain a temperature of the electric machine 246 below a predetermined limit of the Curie temperature limit to, e.g., increase a useful life of the electric machine 246. For example, in certain exemplary embodiments, the cooling system 292 the gas turbine engine 200 may maintain a temperature of the electric machine 246 below at least about a 50 degrees Fahrenheit (° F.) limit of the Curie temperature limit, such as below at least about a 75° F. limit or 100° F. limit of the Curie temperature limit. Maintaining a temperature of the electric machine 246 below such a limit of the Curie temperature limit may further prevent any permanent magnets of the electric machine 246 from experiencing un-recoverable (or permanent) de-magnetization, which may have a negative life impact on the electric machine 246.

Moreover, during operation of a gas turbine engine 200 including an electric machine 246 in accordance with an exemplary embodiment of the present disclosure, the electric machine 246 may be configured to generate a relatively high amount of electric power, such as alternating current electric power. For example, in certain embodiments, the electric machine 246 may be configured to generate and deliver through the electric lines 284 of the electric bus 258 electrical power at five hundred (500) Volts ("V") or more. For example, in certain embodiments, the electric machine 246 may be configured to generate and deliver through the electric lines 284 of the electric bus 258 electrical power at six hundred (600) V or more. Such a configuration may be enabled by the disclosed cooling system 292 284 for maintaining a temperature of the electric machine 246 within a certain operating temperature range, and/or by designing the intermediate portion 286 of the electric bus 258 in a manner allowing it to be traverse the relatively high temperatures within the working air flowpath 221 downstream of the combustion section of the gas turbine engine 200, while carrying the relatively high voltages.

Referring specifically to the embodiment shown, the cooling system 292 includes a cooling fluid supply line 294 and a cooling fluid return line 296. A portion of the electric bus 258 extending through the working air flowpath 221, e.g., the intermediate portion 286 of the electric line 284, is substantially embedded within the cooling fluid supply line 294, and further a portion of the cooling fluid supply line 294 extending through the working air flowpath 221 is substantially embedded within the cooling fluid return line 296.

More specifically, for the embodiment depicted in FIG. 4, all of the portion of the electric line 284 extending through the working air flowpath 221 is embedded within the cooling fluid supply line 294, and similarly, all of the portion of the cooling fluid supply line 294 extending through the working air flowpath 221 is embedded within the cooling fluid return line 296.

In such a manner, it will be appreciated that the electric line 284 is surrounded by a flow of cooling fluid 298 through the cooling fluid supply line 294, such that the intermediate portion 286 of the electric bus 258 traversing the working air flowpath 221 is not exposed directly to anything outside of the cooling fluid supply line 294. Similarly, for the embodiment shown, the cooling fluid supply line 294 is surrounded by a flow of cooling fluid 298 returning through the cooling fluid return line 296, such that cooling fluid supply line 294 traversing the working air flowpath 221 is not exposed directly to anything outside of the cooling fluid return line 296.

Figure 5:
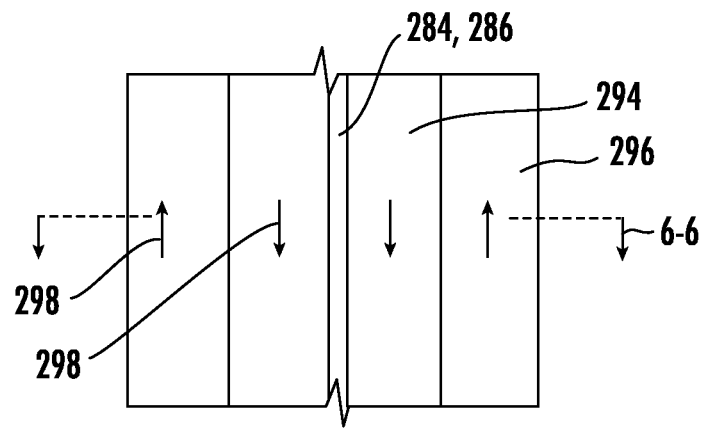
FIG. 5 is a close-up, schematic, cross-sectional view an electric line embedded in a cooling fluid supply line and a cooling fluid return line according to various exemplary embodiments of the present disclosure.
Figure 6:
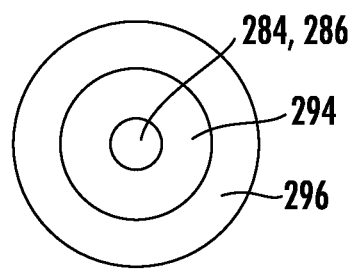
FIG. 6 is a schematic, cross-sectional view of the electric line embedded in the cooling fluid supply line and the cooling fluid return line of FIG. 5, along line 6-6 of FIG. 5.

For example, referring briefly to FIGS. 5 and 6, close-up, cross-sectional views of the cooling fluid supply line 294, the cooling fluid return line 296, and the intermediate portion 286 of the electric bus 258 are shown. In particular, FIG. 5 provides a close-up, schematic, cross-sectional view of this assembly along a lengthwise direction of this assembly, and FIG. 6 provides a close-up, schematic, cross-sectional view of this assembly along the crosswise direction of the assembly (along Line 6-6 in FIG. 5).

In such a manner, the portion of the electric bus 258 extending through the working air flowpath 221 is very well insulated from the relatively high temperatures within the working air flowpath 221, such that the electric line 284 may carry the desired amount of electric power through the working air flowpath 221 and remain within temperature limits for the materials. Further, a flow of cooling fluid 298 through the cooling fluid supply line 294 is also insulated from the relatively high temperatures within the working air flowpath 221, such that the flow of cooling fluid 298 through the cooling fluid supply line 294 may cool, e.g., the electric machine 246, as will be described in more detail below.

More specifically, as noted above, the exemplary cooling system 292 includes the first junction box 288 located outward of the working air flowpath 221 along the radial direction R and the second junction box 290 located inward of the working air flowpath 221 along the radial direction R. The intermediate portion 286 of the electric bus 258 extends from the first junction box 288 to the second junction box 290. At the first junction box 288, the electric line 284 of the electric bus 258 is provided into an interior of the cooling fluid supply line 294, and the cooling fluid supply line 294 is provided to an interior of the cooling fluid return line 296. This embedded arrangement extends to the second junction box 290, where the cooling fluid return line 296 splits off and fluidly connects with the electric machine compartment 280. The cooling fluid return line 296 may scavenge cooling fluid within the electric machine compartment 280, for returning the cooling fluid to a location outward of the working air flowpath 221, as described below.

Also at the second junction box 290, the cooling fluid supply line 294 extends to the electric machine 246, with electric line 284 of the electric bus 258 still embedded therein. For example, referring now to FIG. 7, providing a close-up, schematic view of the electric machine 246, as well as a close-up, schematic view of a portion of the electric bus 258 and the cooling system 292. For the embodiment shown, the cooling fluid supply line 294 is in fluid communication with an electric machine heat exchanger 300, the electric machine 246, or both for cooling the electric machine 246. More specifically, for the exemplary embodiment depicted, the electric machine 246 includes an electric machine heat exchanger 300 thermally coupled to the stator 250 or of the electric machine 246, and further includes an electric machine juncture box 302 for receiving the cooling fluid supply line 294 with an electric line 284 of the electric bus 258 position therein. The electric machine juncture box 302 separates the electric line 284 from the interior of the cooling fluid supply line 294. The electric line 284 electrically couples to the stator 250, and a flow of cooling fluid 298 through the cooling fluid supply line 294 is provided to the electric machine heat exchanger 300. In the embodiment shown, the electric machine heat exchanger 300 includes a plurality of passages 304 that circumferentially surround at least a portion of the stator 250 (extending in a circumferential direction C). The flow of cooling fluid 298 from the cooling fluid supply line 294 flows through these passages 304 to reduce a temperature of the stator 250, and in turn of the electric machine 246.

For the embodiment shown, the electric machine heat exchanger 300 includes an inlet 306 for receiving the flow of cooling fluid 298 from the electric machine juncture box 302 and an outlet 308. In the embodiment shown, the outlet 308 provides the flow of cooling fluid 298 direction to the electric machine compartment 280, to be scavenged by the cooling system return line 296.

Figure 7:
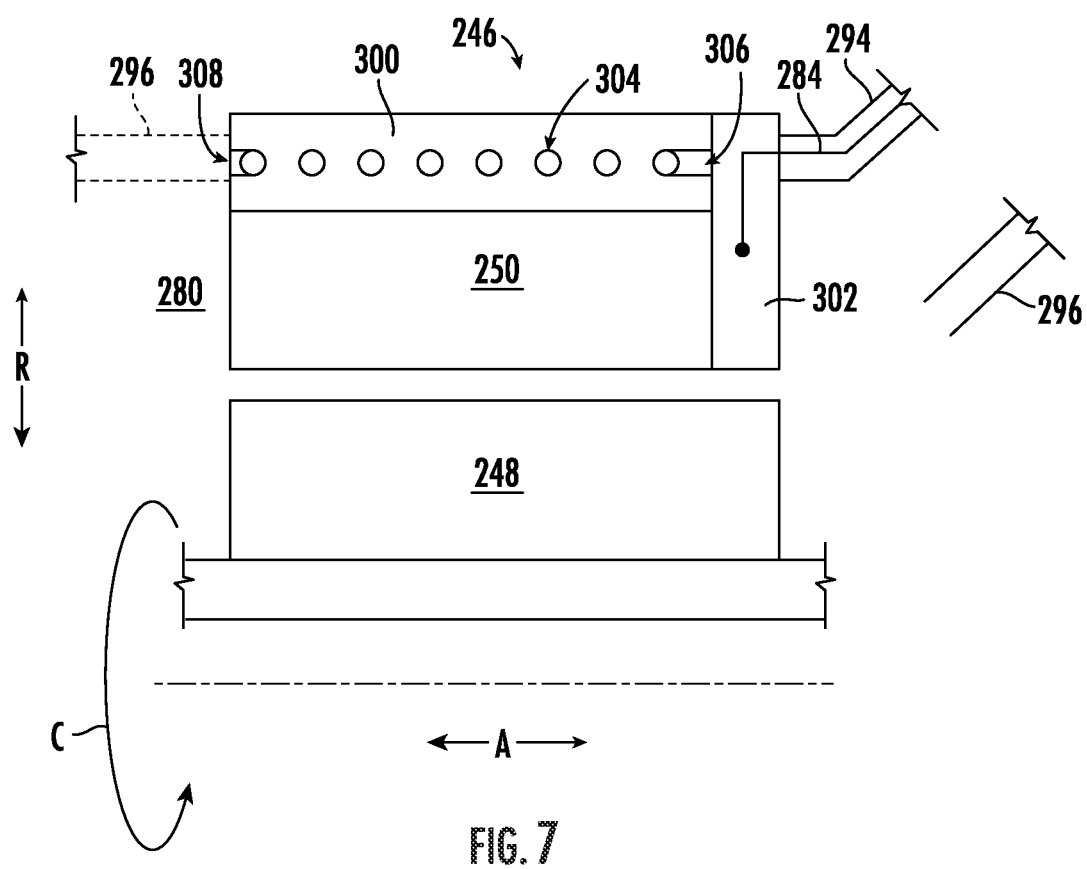
FIG. 7 is a close-up, schematic, cross-sectional view of an electric machine in accordance with an exemplary embodiment of the present disclosure.

Additionally, or alternatively, in other exemplary embodiments, the outlet 308 of the electric machine heat exchanger 300 may be directly fluidly coupled to the cooling fluid return line 296, as is depicted in phantom in FIG. 7.

In one or more of these configurations, the flow of cooling fluid 298 may further act as a lubricant and/or heat exchange fluid for the forward electric machine bearing 264 and the aft electric machine bearing 266 (see FIG. 4). In such manner, it will be appreciated that in certain exemplary embodiments, the flow of cooling fluid 298 may be a flow of a liquid cooling fluid, such as a flow of a lubricating oil.

However, in other exemplary embodiments, the cooling fluid may additionally or alternatively be a gaseous cooling fluid, such as air. With such a configuration, the air may not act as a lubricant for any bearings. However, such may allow for the cooling system 292 to cool the electric machine 246 without needing additional structures or protections for the electric machine 246 for guiding the flow of the cooling fluid. For example, such a configuration, the flow of cooling fluid 298 from the cooling fluid supply line 294 may simply be directed over one or more aspects of the electric machine 246 to cool the electric machine 246.

Referring still to FIG. 4, in the embodiment shown, the cooling system 292 is a closed loop cooling system 292. For example, in the embodiment shown, the cooling fluid supply line 294 and the cooling fluid return line 296 are in series flow communication. For example, during typical operations, a flow of cooling fluid 298 is provided through the cooling fluid supply line 294 to the first junction box 288. Within the first junction box 288, as noted above, the cooling fluid supply line 294 is routed to a conduit embedded within the cooling fluid return line 296 extending through the working air flowpath 221. A relatively cool flow of cooling fluid 298 is then separated at the second junction box 290 to a portion of the cooling fluid supply line 294 extending to the electric machine 246. The relatively cool flow of cooling fluid 298 is then used to remove heat from the electric machine 246, reducing a temperature of electric machine 246. After having accepted heat from the electric machine 246, the relatively warm cooling fluid is provided to the cooling fluid return line 296 and to the second junction box 290. At the second junction box 290, the relatively warm cooling fluid is provided to a portion of the cooling fluid return line 296 surrounding a portion of the cooling fluid return line 296 and extending through the working air flowpath 221 (shielding the relatively cool flow of cooling fluid 298 within the cooling fluid supply line 294 from the high temperatures of the working air flowpath 221) to the first junction box 288. At the first junction box 288, the relatively warm cooling fluid is separated out to a separate cooling fluid return line 296. For the embodiment shown, a coo configured to receive the relatively warm cooling fluid from the cooling fluid return line 296, cool the relatively warm cooling fluid back down to a relatively cool cooling fluid, and provide the relatively cool cooling fluid to the cooling fluid supply line 294. The closed-loop flow may then repeat.

In certain exemplary embodiments, the cooling system 292 further includes a cooling portion 310. The cooling portion 310 of the cooling system 292 may be, e.g., a heat exchanger for reducing a temperature of the cooling fluid. For example, the heat exchanger may be a surface cooler configured to utilize a flow of air over the cowling 206 of the turbomachine, an air-oil cooler heat exchanger, an oil-oil cooler heat exchanger, a heat exchanger integrated with a thermal bus, etc.

Figure 8:
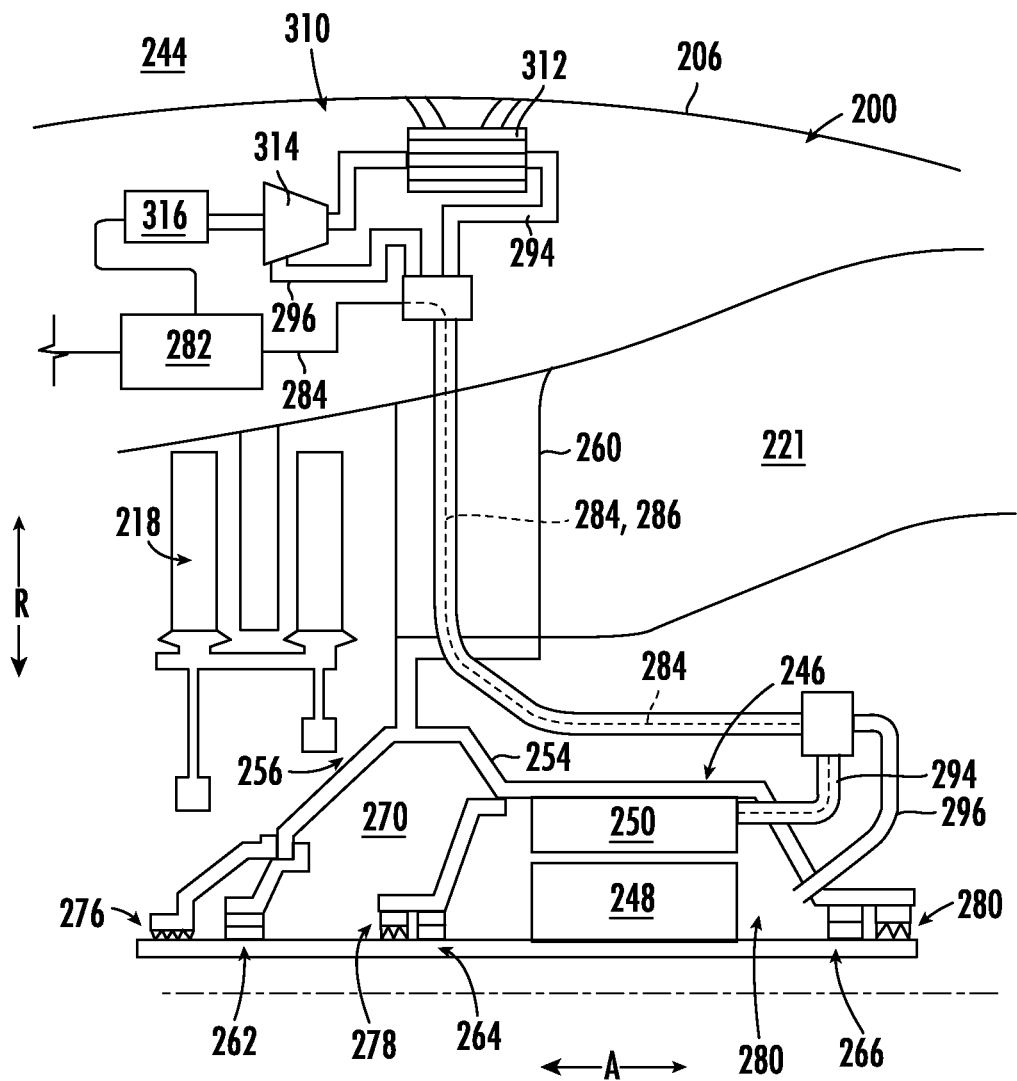
FIG. 8 is a schematic, cross-sectional view of an electric machine embedded in a gas turbine engine in accordance with another exemplary embodiment of the present disclosure.

It will be appreciated, however, than in other exemplary embodiments, the cooling system 292 may have any other suitable configuration. For example, referring now to FIG. 8, a schematic view of a gas turbine engine 200 having an electrical system and a cooling system 292 in accordance with another exemplary embodiment of the present disclosure is provided. The exemplary gas turbine engine 200, electrical system, and cooling system 292 depicted in FIG. 8 may be configured in a similar manner as the exemplary gas turbine engine 200, electrical system, and cooling system 292 described above with reference to FIGS. 4 through 7.

For example the exemplary gas turbine engine 200 depicted includes an electrical system having electric machine 246 embedded within a turbine section of the gas turbine engine 200 and an electrical bus electrically coupled to the electric machine 246 and having an electric line 284 extending through a working air flowpath 221 of the gas turbine engine 200 within or downstream of the turbine section. In addition, the exemplary gas turbine engine 200 includes a cooling cooling fluid supply line 294 in a cooling fluid return line 296 where a portion of the electric machine 246 extending to the air flowpath is essentially embedded within the cooling fluid supply line 294 and a portion of the cooling fluid supply line 294 extending to the working air flowpath 221 is substantially embedded within the cooling fluid return line 296.

Further, for the embodiment shown, the exemplary cooling system 292 further includes a cooling portion 310, the cooling portion 310 including a heat exchanger 312. In certain exemplary embodiments, the heat exchanger 312 may be an air-cooled heat exchanger, using an airflow over the cowl 206 of the turbomachine, as is depicted schematically in FIG. 8.

However, for the embodiment shown, the cooling system 292 further includes an expansion device located downstream of the portion of the cooling fluid return line 296 extending through the working air flowpath 221 and upstream of the cooling portion 310, or rather upstream of the heat exchanger 312. For the embodiment shown, the expansion device is a turbine 314, and the gas turbine engine 200 further includes an auxiliary electric machine 316 driven by the turbine 314. In such a manner, the cooling system 292 may capture heat from, e.g., the electric machine 246, and utilize such heat to generate further power. The expanded cooling fluid from the turbine 314 may be provided to the heat exchanger 312, where a temperature may be further reduced. In such a manner, the cooling system 292 may operate generally according to a Rankine cycle, wherein the hot components inward of the working air flowpath 221 operate to provide the heat and work into the cycle. The turbine 314 and heat exchanger 312 may operate to reduce a temperature of the working fluid.

With such a configuration, it will be appreciated that the cooling fluid may be a single phase cooling fluid, such as a liquid (e.g., a lubrication oil), a supercritical fluid (e.g., a supercritical $CO_2$), etc. Additionally or alternatively, the cooling fluid may be a phase change fluid configured to change between gas and liquid phases based on the cycle of the cooling system 292. In one or more of these configurations, the cooling system 292 may additionally include a compressor, may not include the auxiliary electric machine 316, etc.

Further, in still other exemplary embodiments, any other suitable configuration may be provided for the gas turbine engine 200, the electrical system, and/or the cooling system 292. For example, referring now to FIG. 9, a gas turbine engine 200, an electrical system, and a cooling system 292 in accordance with another exemplary embodiment of the present disclosure is provided. The exemplary embodiment of FIG. 9 may be configured in a similar manner as one or more of the exemplary embodiments described above with reference to FIGS. 3 through 8.

Figure 9:
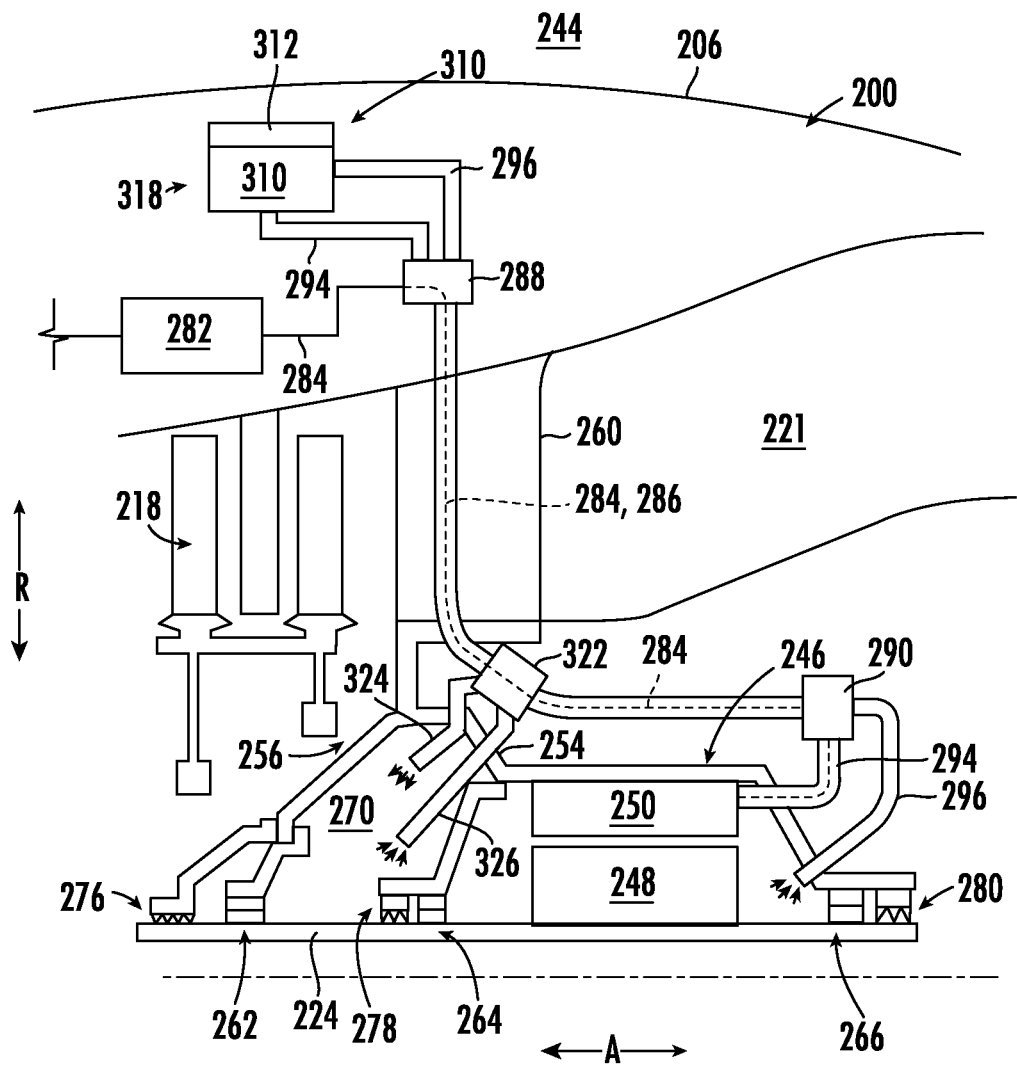
FIG. 9 is a schematic, cross-sectional view of an electric machine embedded in a gas turbine engine in accordance with yet another exemplary embodiment of the present disclosure.

As will further be appreciated from the embodiment depicted in FIG. 9, the gas turbine engine 200 may further include a lubrication oil system 318 for providing a flow of lubrication oil to, e.g., the aft engine bearing 262 within the aft turbine sump 270. For the embodiment shown, the cooling system 292 is integrated with the lubrication oil system 318, such that the flow of cooling fluid 298 through the cooling system 292 has the dual function of acting as a cooling fluid for the electric machine 246 and as a lubrication oil/cooling oil for the lubrication oil system 318. In particular, for the embodiment shown, the cooling system 292 includes a cooling system heat exchanger 312 and the lubrication oil system 318 includes a lubrication oil tank 320. For the embodiment shown, the cooling system heat exchanger 312 is thermally coupled to the lubrication oil tank 320. In such a manner, the cooling system heat exchanger 312 may operate to reduce a temperature of the lubrication oil tank 320 and/or the lubrication oil within the lubrication oil tank 320 (which operates as the cooling fluid for the cooling system 292).

Referring still to FIG. 9, for the embodiment shown, the cooling fluid supply line 294 is configured to provide a flow of cooling fluid 298 to both the electric machine 246 and one or more bearings and/or sumps, and the cooling fluid return line 296 is configured to both return a flow of cooling fluid 298 from the electric machine 246 and from one or more bearings and/or sumps (e.g., operate as a lubrication oil scavenge line). More particularly, for the embodiment shown the cooling fluid supply line 294 is configured to provide the flow of cooling fluid 298 to the electric machine 246 and to the aft turbine sump 270, and the cooling fluid return line 296 is configured to both scavenge cooling fluid 298 from the electric machine and from the aft turbine sump 270.

More particularly, for the embodiment of FIG. 9, the cooling system 292 further includes a third junction box, which for the embodiment show is configured as an intermediate junction box 322 located inward of the working air flowpath 221 along the radial direction R, and between the first and second junction boxes 288, 290. The cooling system 292 further includes a first supply branch 324 of the cooling fluid supply line 294 and a first return branch 326 of the cooling fluid return line 296, each of which fluidly coupled to the intermediate junction box 322. At the intermediate junction box 322, the first supply branch 324 of the cooling fluid supply line 294 receives a flow of relatively cool cooling fluid from the cooling fluid supply line 294. The first supply branch 324 of the cooling fluid supply line 294 is further in fluid communication with the aft turbine sump 270 for providing the relatively cool cooling fluid to the aft turbine sump 270. Similarly, at the intermediate junction box 322 the first return branch 326 of the cooling fluid return line 296 is fluidly coupled to the cooling fluid return line 296 flowing back to the lubrication oil tank. The first return branch 326 of the cooling fluid return line 296 is further fluidly coupled to the aft turbine sump 270 for scavenging relatively hot cooling fluid from the aft turbine sump 270, and returning the relatively hot cooling fluid to the lubrication oil tank 320 via the cooling fluid return line 296.

It will be appreciated, however, than in still other exemplary embodiments, the cooling system 292 and electric bus 258 may have any other suitable configuration. For example, referring now to FIG. 10, a schematic view of a gas turbine engine 200 having an electrical system and a cooling system 292 in accordance with another exemplary embodiment of the present disclosure is provided. The exemplary gas turbine engine 200, electrical system, and cooling system 292 depicted in FIG. 10 may be configured in a similar manner as one or more of the exemplary gas turbine engine 200, electrical system, and cooling systems 292 described above with reference to FIGS. 4 through 9.

Figure 10:
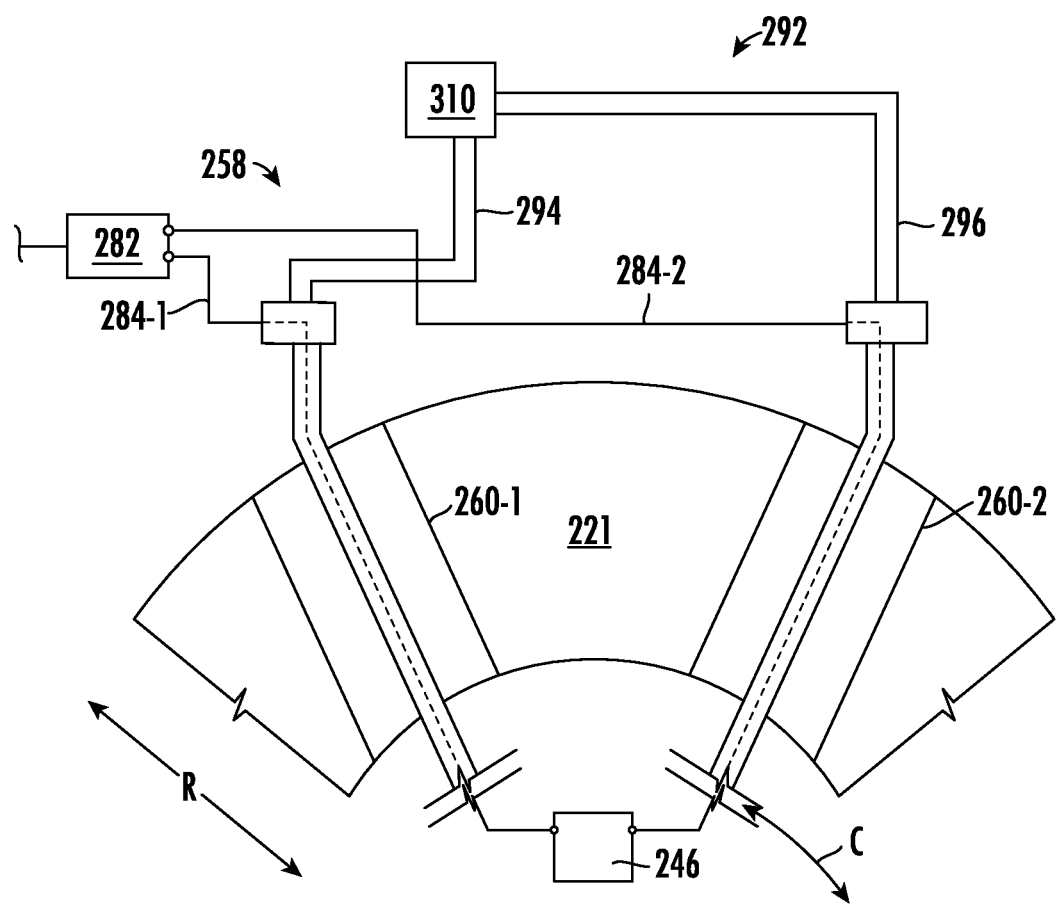
FIG. 10 is a schematic view of a plurality of electric lines embedded in a cooling fluid supply line and a cooling fluid return line according to various exemplary embodiments of the present disclosure.

However, for the exemplary embodiment of FIG. 10, the electric bus 258 of the electric system includes a first electric line 284-1 and a second electric line 284-2 extending through the turbomachinery flowpath 221 to the electric machine 246. The first and second electric lines 284-1, 284-2 may be a positive and a negative electric line, or any other suitable configuration of electric lines.

Further, for the exemplary embodiment depicted in FIG. 10, the cooling system 292 includes a cooling fluid supply line 294 and a cooling fluid return line 296. However, for the embodiment shown, the portion of the cooling fluid supply line 294 extending through the turbomachinery flowpath 221 is not nested within the cooling fluid return line 296. Instead, for the embodiment depicted, the cooling fluid supply line 294 extends through the turbomachinery flowpath 221 within a first strut 260-1 and the cooling fluid return line 296 extends through the turbomachinery flowpath 221 within a second strut 260-2. Moreover, a portion of the first electric line 284-1 extending through the turbomachinery flowpath 221 is nested within the cooling fluid supply line 294, and similarly a portion of the second electric line 284-2 extending through the turbomachinery flowpath 221 is nested within the cooling fluid return line 296. In such a manner, the first and second electric lines 284-1, 284-2 are each shielded from the relatively high temperatures within the turbomachinery flowpath 221 within or downstream of the turbine section of the gas turbine engine 200. Further, with such a configuration, the assembly of cooling fluid supply and return lines 294, 296 and electric lines 284-1, 284-2 may extend through a smaller cross-sectional space (e.g., through smaller struts 260), allowing for smaller struts with less interference (e.g., drag) on an airflow through the turbomachinery flowpath 221.

It will be appreciated that although the embodiment of FIG. 10 shows a single cooling fluid supply line 294 and a single cooling fluid return line 296, the cooling system may include multiple of these lines, spaced along any suitable number of struts 260 other vanes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects and advantages may be derived from one or more configurations of the present disclosure in the clauses below:

A gas turbine engine defining a radial direction and an axial direction, the gas turbine engine comprising: a compressor section and a turbine section arranged in serial flow order, the compressor section and turbine section together defining a working air flowpath; a rotary component rotatable with at least a portion of the compressor section and with at least a portion of the turbine section; an electrical system comprising an electric machine coupled to the rotary component at least partially inward of the working air flowpath along the radial direction and an electric bus electrically coupled to the electric machine, the electric bus including an electric line extending through the working air flowpath within or downstream of the turbine section; and a cooling system comprising a cooling fluid supply line and a cooling fluid return line, wherein a portion of the electric line extending though the working air flowpath is substantially embedded within the cooling fluid supply line, and wherein a portion of the cooling fluid supply line extending though the working air flowpath is substantially embedded within the cooling fluid return line.

The gas turbine engine of one or more of these clauses, wherein all of the portion of the electric line extending though the working air flowpath is embedded within the cooling fluid supply line.

The gas turbine engine of one or more of these clauses, wherein all of the portion of the cooling fluid supply line extending though the working air flowpath is embedded within the cooling fluid return line.

The gas turbine engine of one or more of these clauses, wherein the cooling fluid supply line is in fluid communication with an electric machine heat exchanger, the electric machine, or both for cooling the electric machine.

The gas turbine engine of one or more of these clauses, wherein the cooling system is a closed loop cooling system.

The gas turbine engine of one or more of these clauses, wherein the cooling fluid supply line and the cooling fluid return line are in series flow communication.

The gas turbine engine of one or more of these clauses, wherein the cooling system further comprises an expansion device located downstream of the portion of the cooling fluid return line extending through the working air flowpath and a cooling portion located downstream of the expansion device.

The gas turbine engine of one or more of these clauses, wherein the expansion device is a turbine, and wherein the gas turbine engine further comprises an auxiliary electric machine driven by the turbine.

The gas turbine engine of one or more of these clauses, wherein cooling portion comprises a heat exchanger for receiving heat from a cooling fluid flow through the cooling system.

The gas turbine engine of one or more of these clauses, wherein the cooling system is integrated with a lubrication oil system of the gas turbine engine, and wherein the cooling fluid supply line is configured to provide a flow of cooling fluid to the electric machine and to a sump located inward of the working air flowpath.

The gas turbine engine of one or more of these clauses, wherein the cooling fluid return line is a lubrication oil scavenge line.

The gas turbine engine of one or more of these clauses, wherein the lubrication oil system further comprises a lubrication oil tank, and wherein the cooling system comprises a heat exchanger for cooling a lubrication oil thermally coupled to the lubrication oil tank.

The gas turbine engine of one or more of these clauses, wherein the cooling system utilizes a gaseous cooling fluid or a liquid cooling fluid.

The gas turbine engine of one or more of these clauses, wherein the cooling system utilizes a phase change cooling fluid.

A gas turbine engine defining a radial direction and an axial direction, the gas turbine engine comprising: a compressor section and a turbine section arranged in serial flow order, the compressor section and turbine section together defining a working air flowpath; a rotary component rotatable with at least a portion of the compressor section and with at least a portion of the turbine section; an electrical system comprising an electric machine coupled to the rotary component at least partially inward of the working air flowpath along the radial direction and an electric bus electrically coupled to the electric machine, the electric bus including an electric line extending through the working air flowpath within or downstream of the turbine section; and a cooling system comprising a cooling fluid line, wherein a portion of the electric line extending though the working air flowpath is substantially embedded within the cooling fluid line, and wherein the cooling fluid line extends from a location outward of the working air flowpath along the radial direction to a location inward of the working air flowpath along the radial direction, and wherein the cooling fluid line is in fluid communication with a cavity enclosing the electric machine.

The gas turbine engine of one or more of these clauses, wherein the cooling fluid line is a cooling fluid supply line configured to provide a flow of cooling fluid to the cavity enclosing the electric machine.

The gas turbine engine of one or more of these clauses, wherein the electric line is a first electric line, wherein the electric bus further comprises a second electric line extending through the working air flowpath within or downstream of the turbine section, wherein the cooling system further comprises a cooling fluid return line, and wherein the second electric line is substantially embedded within the cooling fluid return line.

The gas turbine engine of one or more of these clauses, wherein the gas turbine engine comprises a first airfoil and a second airfoil extending through the working gas flowpath withing or downstream of the turbine section and spaced along a circumferential direction of the gas turbine engine, and wherein the cooling fluid supply line extends through the first airfoil and the cooling fluid return line extends through the second airfoil.

An accessory system for a gas turbine engine defining a radial direction and comprising a compressor section and a turbine section arranged in serial flow order and a rotary component rotatable with at least a portion of the compressor section and with at least a portion of the turbine section, the compressor section and turbine section together defining a working air flowpath, the accessory system comprising: an electrical system comprising an electric machine and an electric bus, the electric machine configured to be coupled to the rotary component at least partially inward of the working air flowpath along the radial direction, the electric bus electrically coupled to the electric machine and including an electric line configured to extend through the working air flowpath within or downstream of the turbine section; and a cooling system comprising a cooling fluid supply line and a cooling fluid return line, wherein a portion of the electric line configured to extend though the working air flowpath is substantially embedded within the cooling fluid supply line, and wherein a portion of the cooling fluid supply line configured to extend though the working air flowpath is substantially embedded within the cooling fluid return line.

The accessory system of one or more of these clauses, wherein the cooling fluid supply line is in fluid communication with an electric machine heat exchanger, the electric machine, or both for cooling the electric machine.

What is claimed is:

1. A gas turbine engine defining a radial direction and an axial direction, the gas turbine engine comprising:
    a compressor section and a turbine section arranged in serial flow order, the compressor section and turbine section together defining a working air flowpath;
    a rotary component rotatable with at least a portion of the compressor section and with at least a portion of the turbine section;
    an electrical system comprising an electric machine coupled to the rotary component at least partially inward of the working air flowpath along the radial direction and an electric bus electrically coupled to the electric machine, the electric bus including an electric line extending through the working air flowpath within or downstream of the turbine section; and
    a cooling system comprising a cooling fluid supply line and a cooling fluid return line, wherein a portion of the electric line extending though the working air flowpath is substantially embedded within the cooling fluid supply line, and wherein a portion of the cooling fluid supply line extending though the working air flowpath is substantially embedded within the cooling fluid return line.

2. The gas turbine engine of claim 1, wherein all of the portion of the electric line extending though the working air flowpath is embedded within the cooling fluid supply line.

3. The gas turbine engine of claim 2, wherein all of the portion of the cooling fluid supply line extending though the working air flowpath is embedded within the cooling fluid return line.

4. The gas turbine engine of claim 1, wherein the cooling fluid supply line is in fluid communication with an electric machine heat exchanger, the electric machine, or both for cooling the electric machine.

5. The gas turbine engine of claim 1, wherein the cooling system is a closed loop cooling system.

6. The gas turbine engine of claim 5, wherein the cooling fluid supply line and the cooling fluid return line are in series flow communication.

7. The gas turbine engine of claim 5, wherein the cooling system further comprises an expansion device located downstream of the portion of the cooling fluid return line extending through the working air flowpath and a cooling portion located downstream of the expansion device.

8. The gas turbine engine of claim 7, wherein the expansion device is a turbine, and wherein the gas turbine engine further comprises an auxiliary electric machine driven by the turbine.

9. The gas turbine engine of claim 5, wherein cooling portion comprises a heat exchanger for receiving heat from a cooling fluid flow through the cooling system.

10. The gas turbine engine of claim 1, wherein the cooling system is integrated with a lubrication oil system of the gas turbine engine, and wherein the cooling fluid supply line is configured to provide a flow of cooling fluid to the electric machine and to a sump located inward of the working air flowpath.

11. The gas turbine engine of claim 10, wherein the cooling fluid return line is a lubrication oil scavenge line.

12. The gas turbine engine of claim 10, wherein the lubrication oil system further comprises a lubrication oil tank, and wherein the cooling system comprises a heat exchanger for cooling a lubrication oil thermally coupled to the lubrication oil tank.

13. The gas turbine engine of claim 1, wherein the cooling system utilizes a gaseous cooling fluid or a liquid cooling fluid.

14. The gas turbine engine of claim 1, wherein the cooling system utilizes a phase change cooling fluid.

15. A gas turbine engine defining a radial direction and an axial direction, the gas turbine engine comprising:
   a compressor section and a turbine section arranged in serial flow order, the compressor section and turbine section together defining a working air flowpath;
   a rotary component rotatable with at least a portion of the compressor section and with at least a portion of the turbine section;
   an electrical system comprising an electric machine coupled to the rotary component at least partially inward of the working air flowpath along the radial direction and an electric bus electrically coupled to the electric machine, the electric bus including an electric line extending through the working air flowpath within or downstream of the turbine section; and
   a cooling system comprising a cooling fluid line, wherein a portion of the electric line extending though the working air flowpath is substantially embedded within the cooling fluid line, and wherein the cooling fluid line extends from a location outward of the working air flowpath along the radial direction to a location inward of the working air flowpath along the radial direction, and wherein the cooling fluid line is in fluid communication with a cavity enclosing the electric machine.

16. The gas turbine engine of claim 15, wherein the cooling fluid line is a cooling fluid supply line configured to provide a flow of cooling fluid to the cavity enclosing the electric machine.

17. The gas turbine engine of claim 16, wherein the electric line is a first electric line, wherein the electric bus further comprises a second electric line extending through the working air flowpath within or downstream of the turbine section, wherein the cooling system further comprises a cooling fluid return line, and wherein the second electric line is substantially embedded within the cooling fluid return line.

18. The gas turbine engine of claim 17, wherein the gas turbine engine comprises a first airfoil and a second airfoil extending through the working gas flowpath withing or downstream of the turbine section and spaced along a circumferential direction of the gas turbine engine, and wherein the cooling fluid supply line extends through the first airfoil and the cooling fluid return line extends through the second airfoil.

19. An accessory system for a gas turbine engine defining a radial direction and comprising a compressor section and a turbine section arranged in serial flow order and a rotary component rotatable with at least a portion of the compressor section and with at least a portion of the turbine section, the compressor section and turbine section together defining a working air flowpath, the accessory system comprising:
   an electrical system comprising an electric machine and an electric bus, the electric machine configured to be coupled to the rotary component at least partially inward of the working air flowpath along the radial direction, the electric bus electrically coupled to the electric machine and including an electric line configured to extend through the working air flowpath within or downstream of the turbine section; and
   a cooling system comprising a cooling fluid supply line and a cooling fluid return line, wherein a portion of the electric line configured to extend though the working air flowpath is substantially embedded within the cooling fluid supply line, and wherein a portion of the cooling fluid supply line configured to extend though the working air flowpath is substantially embedded within the cooling fluid return line.

20. The accessory system of claim 19, wherein the cooling fluid supply line is in fluid communication with an electric machine heat exchanger, the electric machine, or both for cooling the electric machine.

* * * * *